C. H. WESTEN.
SHOCK ABSORBER.
APPLICATION FILED APR. 10, 1909.
1,207,250.
Patented Dec. 5, 1916.
2 SHEETS—SHEET 2.
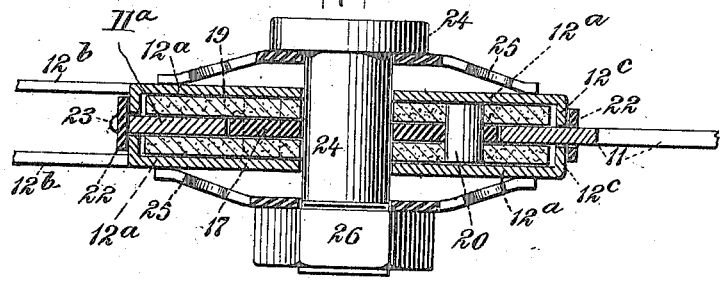
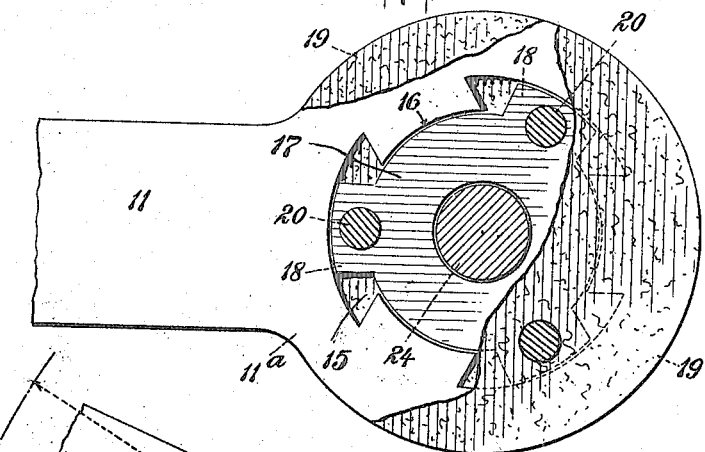
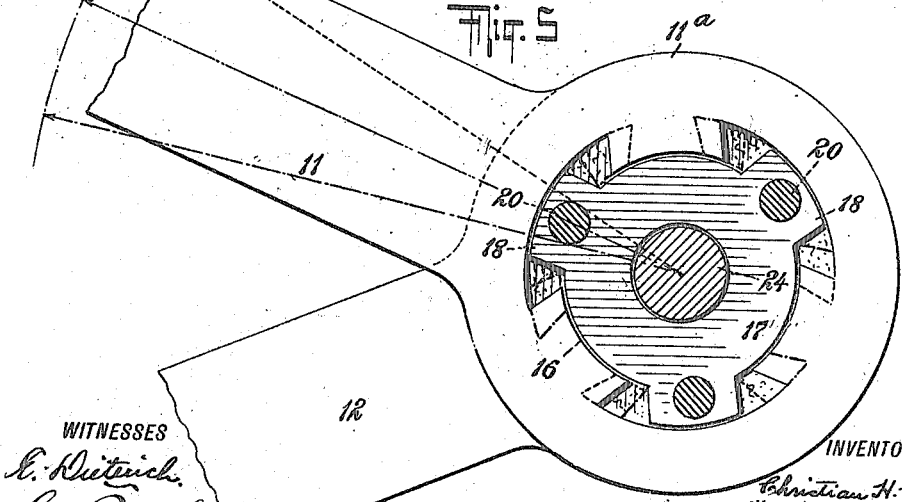
WITNESSES
INVENTOR
Christian H. Westen
BY Conrad A. Dietrich
his ATTORNEY

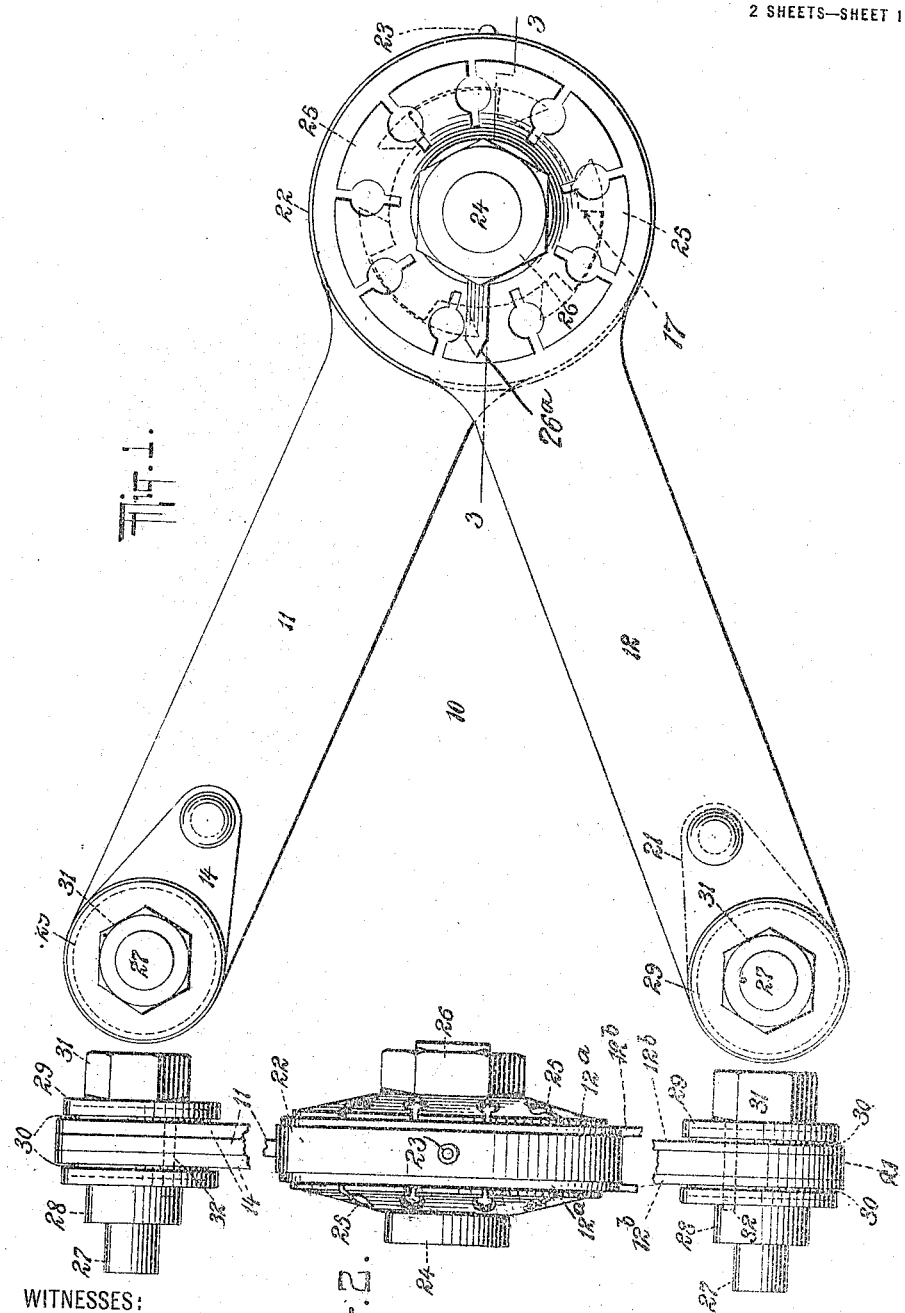

UNITED STATES PATENT OFFICE.

CHRISTIAN H. WESTEN, OF WEST HOBOKEN, NEW JERSEY, ASSIGNOR, BY MESNE ASSIGNMENTS, TO HARTFORD SUSPENSION COMPANY, OF JERSEY CITY, NEW JERSEY, A CORPORATION OF NEW YORK.

SHOCK-ABSORBER.

1,207,250.   Specification of Letters Patent.   Patented Dec. 5, 1916.

Application filed April 10, 1909. Serial No. 489,122.

*To all whom it may concern:*

Be it known that I, CHRISTIAN H. WESTEN, a citizen of the United States, residing at West Hoboken, Hudson county, in the State of New Jersey, have invented certain new and useful Improvements in Shock-Absorbers, of which the following is a full, clear, and exact specification.

My invention relates to improvements in means for modifying or retarding the action of vehicle springs, and the same has for its object to provide a simple, efficient and reliable apparatus which may be readily attached to vehicles and adjusted to suit the different conditions under which the vehicle is used.

Further, said invention has for its object to provide an apparatus which, when once properly adjusted will readily accommodate itself to the varying conditions or load imposed upon the vehicle.

Further, said invention has for its object to provide an apparatus which will automatically adjust itself to its neutral position regardless of the load carried by the vehicle.

Further, said invention has for its object to provide an apparatus capable of offering different degrees of resistance to the action of the vehicle springs in order to suit the varying character of the roads traversed.

Further, said invention has for its object to provide an apparatus which will offer a less degree of resistance at the beginning of its movement whereby to control the action of the springs when the vehicle is traveling over comparatively smooth roads, and then will offer a greater degree of resistance to the action of said springs when the vehicle is traveling over comparatively rough or uneven roads.

To the attainment of the aforesaid objects and ends my invention consists in the novel details of construction, and in the combination, connection and arrangement of parts, hereinafter more fully described and then pointed out in the claims.

In the accompanying drawings forming part of this specification wherein like numerals of reference indicate like parts, Figure 1 is a side view showing one form of shock absorber constructed according to and embodying my said invention; Fig. 2 is an end view thereof; Fig. 3 is a section taken essentially on the line 3-3 of Fig. 1, the arm members being shown fully extended; Fig. 4 is a detail side view partly broken away, showing the construction of the retarding means provided upon the head of the intermediate arm or member, and Fig. 5 is a side view partly broken away and in section showing the apparatus in neutral position, and diagrammatically the extent of its movements above and below the neutral position.

In said drawings 10 designates the apparatus as a whole, comprising a pair of pivoted arms 11 12 corresponding in outline and provided with enlarged portions or heads 11$^a$ 12$^a$. The arm 11 is formed of a single piece of sheet steel and provided upon the opposite surfaces of its free end with reinforcing plates 14 14, and at its pivoted or enlarged end 11$^a$ with a centrally located circular recess 15 having three inwardly extending projections or lugs 16 16 16 arranged equally separated from each other, and 17 denotes a plate located within the recess 15 and provided with three projections 18 18 18 which are adapted to extend intermediate the projections or lugs 16 16 16 on the head 11$^a$.

19 19 denote circular disks of fiber or other suitable bearing material which are disposed upon the opposite sides of the enlarged portion or head 11$^a$ and secured in operative position thereon by pins 20 20 20 extending through said packing disks 19 19, and the plate 17 disposed intermediate said disks and within the recess 15 of the arm 11, so that the said disks 19 19 and plate 17 shall rotate jointly.

The arm 12 is composed of two similarly shaped members 12$^b$ 12$^b$ which are secured together at their outer ends and to a reinforcing plate 21 arranged intermediate said ends, and the enlarged portions or heads 12$^a$ 12$^a$ are provided with rims 12$^c$ 12$^c$ which are adapted to fit upon and partly inclose the edges of the packing disks 19 19 secured upon the enlarged portion or head 11$^a$ on the arm 11.

22 denotes an annular plate provided with an opening to receive the arm 11, which plate is adapted to be fitted over the opposing edges of the rims 12$^c$ 12$^c$ on the heads 12$^a$ 12$^a$ and be secured to the edge of the head 11$^a$ by a screw 23.

24 denotes a bolt extending through the heads 12ᵃ 12ᵃ of the arm 12 and through the packing disks 19 19 and plate 17, and 25 25 denote dished spring plates disposed upon the opposite sides of the heads 12ᵃ 12ᵃ and held under tension against the outer surfaces of said heads 12ᵃ 12ᵃ by means of a nut 26 having a pointer 26ᵃ secured thereon for indicating upon said spring plate the degree of the tension with which the same bear upon the heads 12ᵃ 12ᵃ.

27 27 denote studs provided with collars 28 28. One of said studs is adapted to be secured at its inner end to the vehicle frame and the other to a suitable clip provided upon the axle of the running gear, and the outer ends of said studs are screw threaded and extend through the outer ends of the arms 11 12 and the reinforcing plates 14 21 therein.

29 29 denote cupped washers disposed upon the studs or bolts 27 27 at the opposite sides of the outer ends of the arms 11 12, and 30 30 denote packings disposed in said cupped washers 29 29 which bear against the outer surfaces of the arm members 12ᵇ 12ᵇ of the arm 12, and the opposite surfaces of the reinforcing plates 14 14 of the arm 11.

31 31 denote nuts secured upon the threaded ends of said bolts whereby to hold the ends of said arms secured in position upon said studs and to the several parts of the vehicle.

32 32 denote keys which extend through the cupped washers 29 29, and the packings 30 30 therein, and the outer ends of the arms whereby to hold the ends of said arms 11 12 in operative position upon said studs 27 27, one to the frame of the vehicle and the other to a suitable clip or fastening device provided upon the axle of the running gear at a point directly below the point where the upper stud 27 is secured to the frame. Hereupon the outer ends of the arms 11 12 are secured in position upon said bolts by means of the nuts 31 31.

As the vehicle travels over the ground and the body moves relatively to the running gear owing to the inequalities or unevenness of the road traversed the intermediate arm 11 which has its head disposed intermediate the packings 19 19 will be caused to rotate upon the periphery of the plate 17 until the projections 16 16 thereof engage the projections 18 18 of said plate 17 and thereupon cause the disks 19 19 to be rotated with said arms 11 11. As the disks 19 19 are rotated the outer surfaces thereof will be frictionally retarded by their engagement with the inner surfaces of the heads 12ᵃ 12ᵃ of the arm 12, under tension of the springs 25 25 bearing upon the outer surface of the said plates 12ᵃ 12ᵃ. The tension of said spring may be regulated by the bolt 24 and nut 26 thereon.

It will be noted that initially the head 11ᵃ is free to move intermediate the disks 19 19 except as retarded thereby which retarding action only occurs between the portion of said heads 11ᵃ which contact with the inner opposing surfaces of the disks 19 19, and that thereupon as the projections 16 16 of said head 11ᵃ engage the projections 18 18 of the plate 17, the head 11ᵃ together with the disks 19 19, and plate 17 will be caused to rotate upon the bolt 24, and a greater degree of friction encountered owing to the fact that the entire outer surfaces of the disks 19 19 are now engaged by the inner surfaces of the heads 12ᵃ 12ᵃ and the rotation thereof retarded.

The operation of the apparatus is as follows: As the vehicle travels over the road the body portion thereof will rise and fall as it passes over inequalities of the road owing to its being spring-supported upon the running gear. As slight inequalities of the road are encountered a relatively small movement of the body will occur, and therefore only a small degree of resistance will be required to prevent the undue movement of the springs. This resistance will be provided initially by the movement of the arms 11 12 which movement is retarded by the action of the inner surfaces of the disks 19 19, adjacent to their outer edges, bearing upon the opposite sides of the head 11ᵃ intermediate the edges of the recess 15, and the periphery of said head 11ᵃ. During this partial initial movement the projections 16 16 16 of the head 11 are free to move around the plate 17, but as soon as a greater obstruction or irregularity is encountered, the projections 16 16 16 of the head 11ᵃ will contact with the edges of the projections 18 18 18 of the plate 17, and cause the same to rotate therewith. As soon as this occurs the frictional retarding action is transferred from the inner surface of the disks 19 19, (which are only in engagement with the portion of the head 11ᵃ surrounding the recess 15 thereof,) to the outer surfaces of said disks 19 19 which outer surfaces are wholly in engagement with the inner surfaces of the heads 12ᵃ 12ᵃ of the arm 12, and held under tension against the same by the action of the spring plates 25 25, bolt 24 and nut 26, and thus offer a greater degree of resistance to the action of the vehicle springs. As the vehicle body again descends the outer ends of the arms 11 12 are again brought together. However, as the body descends below its normal level owing to the inertia of the body, the arms 11 12 will be forced together beyond their normal position, and with the reaction of the vehicle springs, and the consequent slight rise of the vehicle body upon the running gear, the pivoted parts of the apparatus arranged upon and surrounding the bolt 24 will be restored to the neutral position as illustrated in full lines at Fig. 5.

Having thus described my said invention, what I claim and desire to secure by Letters Patent, is:—

1. A shock absorber comprising a plurality of pivotally connected members, friction means for retarding the movement of said members; one of said members consisting of a plurality of parts, of which one part severally by its engagement with a portion of said friction means is adapted to retard the movement of said members for a part of their movement, and several of said parts jointly in combination with said friction means serving to render the whole of another part of said friction means operative to retard the movement of said members for the remainder of their movement, substantially as specified.

2. A shock absorber comprising a plurality of pivotally connected members, and friction means for retarding the movement of said members for a part of their movement by the engagement of a certain part thereof with a portion of one side of said friction means, and for retarding the movement of said members for the remainder of their movement by the engagement thereof with the entire surface of another side of said friction means, substantially as specified.

3. A shock absorber comprising a plurality of pivotally connected members, and friction means for retarding the movement of said members for a part of their movement by the engagement of a certain part thereof with a portion of one side of said friction means to produce one degree of frictional resistance, and for retarding the movement of said members for the remainder of their movement by the engagement thereof with the entire surface of another side of said friction means to produce a different degree of frictional resistance, substantially as specified.

4. A shock absorber comprising a plurality of pivotally connected members, and friction means for retarding the movement of said members for a part of their movement by the engagement of a part thereof with a portion of one side of said friction means to produce a relatively small degree of frictional resistance, and for retarding the movement thereof for the remainder of their movement by the engagement thereof with the entire surface of another side of said friction means to produce a greater degree of frictional resistance, substantially as specified.

5. A shock absorber comprising a plurality of pivotally connected members, and friction means for retarding the movement of said members for a part of their movement by the engagement of a part thereof with one side of said friction means, and for retarding the movement thereof for the remainder of their movement by the engagement thereof with another side of said friction means, substantially as specified.

6. A shock absorber comprising a plurality of pivotally connected members, and friction means interposed between the connected ends of said members for retarding the movement of said members for a part of their movement by the engagement of a part thereof with a portion of one side of said friction means, and for retarding the movement thereof for the remainder of their movement by the engagement thereof with another side of said friction means, substantially as specified.

7. A shock absorber comprising a pair of pivotally connected members, and a friction disk interposed between the connected ends of said members for retarding the movement of said members for a part of their movement by the engagement of a limited portion thereof with one side of said friction disk, and for retarding the movement thereof for the remainder of their movement by the engagement thereof with a greater portion of the other side of said friction disk, substantially as specified.

8. A shock absorber comprising a pair of pivotally connected members, a friction disk interposed between the connected ends of said members for retarding the movement of said members for a part of their movement by the engagement of a part thereof with one side of said friction disk, and for retarding the movement thereof for the remainder of their movement by the engagement thereof with the other side of said friction disk, and means for transferring the retarding action from one side of said friction disk to the other side thereof, substantially as specified.

9. A shock absorber comprising a pair of arms, one of said arms having a bifurcated end, and the other of said arms consisting of a plurality of parts, a pair of friction disks having a portion of their inner faces in frictional engagement with one of the parts of said second-named arm for producing one degree of frictional resistance during a part of the movement of said arms, and the entire outer faces of said friction disks in engagement with the bifurcated ends of the other of said arms for producing a different degree of uniform frictional resistance during the remainder of said movement of said arm, substantially as specified.

10. A shock absorber comprising a pair of arms, one of said arms having a bifurcated end, a pair of disks arranged upon opposite sides of one of said arms and having each a relatively small portion of its inner surface in engagement with said arm for offering a relatively small degree of uniform frictional resistance to the movement of said parts, and a greater portion of the outer surface of each disk in engagement with the bifurcated end of the other of said arms, and means for regulating the frictional engagement of the pivoted ends of said arms, substantially as specified.

11. A shock absorber comprising a pair of arms, one of said arms having a bifurcated end, a pair of friction disks yieldingly secured to one of said arms, and each having a relatively small portion of its inner surface in engagement with said arm for offering a small degree of uniform frictional resistance to the movement of said arms, and its outer surface in engagement with one of the bifurcated ends of the other of said arms for offering a greater degree of uniform frictional resistance to the movement of said arms, means for pivotally securing said parts together, and spring means interposed between the ends of said securing means and the outer surfaces of the bifurcated end of said arm, substantially as specified.

12. A shock absorber comprising a pair of arms, heads on each of said arms; one of said arms having its head bifurcated, and the other having a central recess therein, a plate disposed within said recess and adapted to move independently of its arm during a part of the movement of said arms, and to engage with its arm and move therewith during the remainder of the movement of said arms, a pair of friction disks rigidly secured to said plate having a portion of their inner sides in engagement with the opposite sides of the head intermediate the same, and a greater portion of their outer sides in engagement with the inner sides of the bifurcated heads of other of said arms, and means for pivotally securing said heads, and the parts intermediate the same together, substantially as specified.

13. A shock absorber comprising a pair of arms, one of said arms having a bifurcated end, and the other a central recess provided with inwardly extending projections, a plate disposed within said recess, a plurality of projections thereon arranged intermediate the projections on said arm, a pair of friction disks rigidly secured to said plate, and having a portion of their inner sides in engagement with the opposite sides of said arm, and a greater portion of their outer sides in engagement with the inner sides of said bifurcated head, means for pivotally connecting the ends of said arms together, and spring means thereon and means for regulating the frictional engagement of said pivoted parts, substantially as specified.

14. A shock absorber comprising a pair of arms, one of said arms having a bifurcated end, and the other of said arms having a circular recess provided with projections thereon along its edge, a plate disposed in said recess having projections adapted to engage the projections on said arm, a pair of friction disks disposed upon the opposite sides of said arm and secured to the plate disposed within the recess therein and adapted to engage the bifurcated end of the arm first named, a bolt pivotally connecting said parts together, and springs disposed upon said bolt intermediate its opposite ends and the outer surfaces of said bifurcated arm, substantially as specified.

15. A shock absorber comprising a pair of pivoted members, one of said members consisting of two corresponding parts secured together at one end, and separated at their opposite ends, heads arranged upon said opposite ends, rims upon said heads, a head on the other of said members having a central recess therein, a plurality of projections extending into said recess, a plate disposed in said recess having projections thereon adapted to engage the projections on said member, friction disks disposed upon the opposite sides of said plate and having their inner surfaces in engagement with the head surrounding said plate, and their outer surface in engagement with the inner surfaces of the heads on the member first named, an annular plate secured to the last named head and inclosing the opposing rims of the heads on said first named member, springs disposed upon the outer surfaces of said heads, and a bolt for securing said intermeshing heads and related parts together, substantially as specified.

16. In a shock absorber, the combination of a pair of friction members of circular outline, a third friction member of annular form located between the said first-mentioned members and adapted to frictionally engage the inside faces of said members near the periphery thereof, a connection between said annular member and said first-mentioned members whereby the annular member may have a limited movement independent of said first-mentioned members, but which engages and causes said members to move with said annular member beyond said limited movement, a fourth frictional member coöperating with one of the first-mentioned members, an operating arm for said fourth member, and means for regulating the pressure between the said members, substantially as specified.

17. In a shock absorber, the combination of a pair of rotatable friction members relatively non-rotatable, a third friction member of annular form located between the said first-mentioned members and adapted to frictionally engage the inside faces thereof near their peripheries, engaging means between said annular member and said first two members which permit of a limited independent movement of the annular member, but which causes the said annular member to move the first-mentioned members when the annular member is moved beyond the limit of independent movement, a fourth friction member coöperating with the outer face of one of the first-mentioned members, a bolt axially disposed with respect to all of said members, and a spring and nut on said bolt for regulating the pressure between said members.

Signed at the city of New York, in the county and State of New York, this third day of April, nineteen hundred and nine.

CHRISTIAN H. WESTEN.

Witnesses:
CONRAD A. DIETERICH,
ELIZABETH B. KING.